(12) United States Patent
Payne et al.

(10) Patent No.: US 7,772,376 B2
(45) Date of Patent: Aug. 10, 2010

(54) MANUFACTURING PROCESS

(75) Inventors: David Martin Payne, Grangemouth (GB); Douglas John Edwin Spencer, Grangemouth (GB); John Heathcote Atherton, Huddersfield (GB); Zachary Richard Meadows, Grangemouth (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 732 days.

(21) Appl. No.: 11/632,839

(22) PCT Filed: Jul. 18, 2005

(86) PCT No.: PCT/GB2005/002805

§ 371 (c)(1),
(2), (4) Date: Jan. 19, 2007

(87) PCT Pub. No.: WO2006/008495

PCT Pub. Date: Jan. 26, 2006

(65) Prior Publication Data

US 2009/0118478 A1    May 7, 2009

(30) Foreign Application Priority Data

Jul. 20, 2004    (GB) ................................ 0416256.6

(51) Int. Cl.
*C09B 41/00* (2006.01)
(52) U.S. Cl. ..................................................... 534/581
(58) Field of Classification Search .................. None
See application file for complete search history.

(56) References Cited

U.S. PATENT DOCUMENTS

| 3,423,391 | A |   | 1/1969 | Kindler et al. .............. 260/141 |
|---|---|---|---|---|
| 4,234,478 | A |   | 11/1980 | Atherton et al. ............. 260/141 |
| 4,252,718 | A |   | 2/1981 | Atherton et al. |
| 4,454,067 | A |   | 6/1984 | Behringer et al. |
| 4,740,551 | A | * | 4/1988 | Foster .......................... 525/52 |
| 4,918,168 | A |   | 4/1990 | Stepaniuk et al. ............ 534/565 |
| 5,770,756 | A | * | 6/1998 | Blake et al. ................... 558/43 |
| 6,118,021 | A |   | 9/2000 | Gottschlich et al. |
| 6,147,196 | A | * | 11/2000 | Stern et al. ................... 554/170 |
| 7,084,309 | B2 | * | 8/2006 | Codignola ................... 568/716 |
| 7,453,012 | B2 | * | 11/2008 | Bocquenet et al. .......... 564/492 |
| 2003/0088117 | A1 | * | 5/2003 | Hollfelder et al. ........... 556/473 |
| 2003/0125598 | A1 |   | 7/2003 | Chisholm et al. |
| 2008/0227994 | A1 | * | 9/2008 | Glasl et al. .................. 554/167 |

FOREIGN PATENT DOCUMENTS

| DE | 2312421 A1 | 5/1974 |
|---|---|---|
| DE | 23 52 735 A1 | 10/1975 |
| DE | 4025037 A1 | 2/1991 |
| EP | 0 421 927 A | 4/1991 |
| EP | 1 329 259 A | 7/2003 |
| GB | 1375107 | 11/1974 |
| GB | 1 381 790 A | 1/1975 |
| GB | 1 547 759 A | 6/1979 |
| GB | 2 014 597 A | 8/1979 |
| WO | WO 03/062188 A | 7/2003 |

OTHER PUBLICATIONS

Database WPI; Section Ch, Week 199634, Derwent Publications Ltd., London, GB; AN 1996-339406, XP002346657.

* cited by examiner

*Primary Examiner*—Fiona T Powers
(74) *Attorney, Agent, or Firm*—Morgan Lewis & Bockius LLP

(57) ABSTRACT

A process for the preparation of a desired chemical compound in a continuous reactor in which a part of the product stream exits the reactor and part of the product stream is recycled around the reactor in order to reduce the amount of buffer that would otherwise be required.

13 Claims, 1 Drawing Sheet

MANUFACTURING PROCESS

Figure 1:
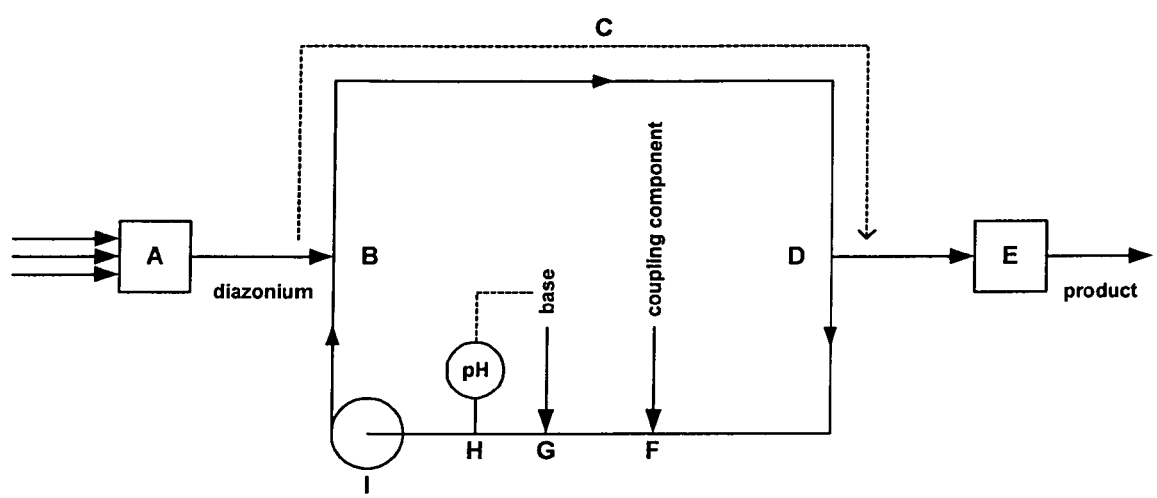

This invention relates to a process for the preparation of chemical compounds.

The continuous manufacture of chemical compounds has been known for a number of years. For example, U.S. Pat. No. 4,252,718 describes a continuous process for the preparation of an aqueous slurry of water-insoluble azo compounds which comprises continuously mixing together a diazonium salt and a coupling component reactive therewith and continuously removing all of the desired azo compound from the reaction mixture.

One of the problems encountered with conventional continuous manufacturing processes is pH control. The starting materials or products are often unstable outside of a particular pH range. Variations in pH outside of a particular range can have an adverse impact on the yield of desired product due to decomposition or the occurrence of undesirable, competing reactions.

In U.S. Pat. No. 4,252,718 a pH sensitive probe was used to monitor the pH of the product stream. Base was added as required.

While addition of buffer to continuous manufacturing processes has hitherto been necessary in many cases to obtain the desired pH for reaction, the associated costs can be considerable. The buffer has to be topped-up regularly and this is expensive. Furthermore, separation of the product from the buffer can be difficult and expensive. On the other hand, leaving buffer in the product can have undesirable effects on the properties of the product. For example buffers can affect the co-ordination properties of organometallic products and, in the case of organometallic dyes (e.g. metallised azo dyes) the buffer can adversely affect the shade, brightness and/or fastness properties of the dye.

There is a need for a method of reducing the amount of buffer required to keep the pH of chemical manufacturing processes within a desired range.

According to the present invention there is provided a process for the preparation of a desired chemical compound in a continuous reactor which comprises the following stages:
 (i) mixing together in a reaction zone of the reactor at a pH within a desired pH range a first stream comprising a first compound and a second stream comprising a second compound capable of reacting with the first compound such that a product stream containing the desired chemical compound is formed;
 (ii) removing part of the product stream from the reactor, leaving part of the product stream in the reactor; and
 (iii) recirculating the product stream remaining in the reactor from stage (ii) into the reaction zone thereby assisting maintenance of the desired pH range during a subsequent performance of stage (i).

By recirculating the product stream the amount of buffer required to maintain the desired pH can be reduced, sometimes (depending on the properties of the desired chemical compound) to the extent that little or no buffer needs to be added to the reactor. In one embodiment the desired chemical compound has acid and/or basic groups and itself acts as a buffer for maintaining the desired pH range, e.g. in a subsequent performance of step (i). In this way one may avoid the need to add exogenous buffer. However if desired, buffer may be added to the reactor, preferably to that part of the product stream which remains in the reactor after step (ii), to help maintain the desired pH range.

Examples of reactions include azo coupling, acylation, sulphurisation, polymerisation, cyanation, halogenation, condensation and saponification reactions.

Typically the first stream containing a first compound and the second stream comprising a second compound are introduced continuously into the reactor (e.g. a loop reactor) where the first and second compounds react together as they flow through the reactor in what may be referred to as a reaction zone. Following reaction between the first and second compounds, part of the resultant desired chemical compound is removed from the reactor in the form of a product stream and the remaining desired chemical compound (together with any remaining exogenous buffer) is recycled into the first and second streams where the recirculated product stream acts as a pH buffer for the reaction between newly introduced compounds in the first and second streams.

In step (ii) the relative proportions of product which is recirculated around the reactor compared to the proportion which it is removed, referred to herein as the Recirculation Ratio, is defined as follows:

$$\text{Recirculation Ratio} = \frac{\text{flow rate in litres per hour of recycled product stream}}{\text{removal rate of product stream in litres per hour}}.$$

For example, if the flow rate of recycled product stream averages 10 liters/hour and the product stream is removed at an average rate of 2 liters/hour the Recirculation Ratio is 10/2=5.

The proportion of the desired chemical compound left in the reactor to assist maintenance of the desired pH range in subsequent performance of stage (i) depends to some extent on the pH buffering properties of the desired chemical compound, the desired pH range, the amount of added buffer (if any) and the sensitivity of the first and second compounds to changes in pH. In general, the process is performed with an average Recirculation Ratio of 50 to 0.3, more preferably 10 to 1, especially 7 to 3. The optimum Recirculation Ratio for manufacturing a particular desired chemical compound may be calculated using knowledge of the reaction mass balance, the pKa's of the starting materials and desired chemical compound and the desired pH range.

The process stages are normally performed continuously until the required quantity of desired chemical compound has been made. At steady state, stages (i), (ii) and (iii) are generally performed simultaneously, albeit at different points of the reactor. For example, in a continuous reactor comprising a pipe in the form of a continuous loop the reaction zone may exist along a certain length of the loop, part of the desired chemical compound is removed at one or more points further along the loop and the remaining desired chemical compound together with any additional buffer flows around the loop back into the reaction zone where it or they assist maintenance of the desired pH range.

Preferably one of the first and second compounds comprises a diazonium salt. Preferably the other of the first and second compounds comprises a compound capable of forming an azo bond by reacting with the diazonium salt in the reaction zone (often called a "coupling component").

Preferably the desired chemical compound is an azo compound, more preferably an azo colorant, especially an azo dye.

According to a first mode of operation the process has one reaction zone. For example the process comprises formation of a diazonium salt external to the reactor and feeding this salt into the reactor for reaction with a coupling component in the reaction zone. This first mode is illustrated in FIG. 1. Alternatively, the reactor may comprise more than one reaction zone, for example diazotization occurs in one reaction zone of the reactor (e.g. by reaction of an amine and a diazotising agent in acidic solution), then a stream comprising a coupling component is introduced further along the reactor and reacts in a further reaction zone with the diazonium salt produced in the previous reaction zone. When the reactor comprises more than one reaction zone it is preferred that the desired pH in each reaction zone is similar or identical.

The reaction between the first and second compound is preferably carried out under such conditions that the streams are mixed together completely and intimately in one or more stages in a time sufficiently short to ensure a high degree of selectivity towards the reaction producing the desired chemical compound and in particular to minimise decomposition of any of the starting materials.

In cases where the reaction is an azo coupling reaction (i.e. reaction of a diazonium salt with a coupling component), the diazonium salt may be obtained from diazotisation of one or more amines with a diazotizing agent (e.g. $NaNO_2$ in acid medium), for example one or more amines selected from the following list: 2,4-dinitroaniline, 2-bromo-4,6-dinitroaniline, 2-cyano-4,6-dinitroaniline, 1-amino-2,4-dinitrobenzene-6-methylsulphone, 2,6-dicyano-4-nitroaniline, 2-cyano-4-nitroaniline, 2-chloro-4-nitro-6-cyanoaniline, 2-bromo-4-nitro-6-cyanoaniline, 2-cyano-4-nitro-6-methylaniline, 2-bromo-6-chloro-4-nitroaniline and 2,6-dichloro-4-nitroaniline. The diazotisation may be performed in the reactor or, more preferably in a reaction vessel which does not form part of the continuous reactor.

Heterocyclic amines may be derived from imidazoles, thiazoles, triazoles, pyridines, pyrazoles, benzthiazoles, thiadiazoles, thiophenes, isothiazoles, benzisothiazoles or benztriazoles.

Examples of heterocyclic amines are 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chlorophenyl)-thiazole, 2-amino-4-(4'-nitrophenyl)thiazole, 3-aminopyridine, 3-aminoquinoline, 3-aminopyrazole, 5-amino-1-phenylpyrazole, 3-aminoindazole, 3-amino-2-methyl-5,7-dinitroindazole, 3-amino-1,2,4-triazole, 5-(methyl-, ethyl-, phenyl- or benzyl)-1,2,4-triazole, 3-amino-1-(4'-methoxyphenyl)pyrazole, 2-aminobenzthiazole, 2-amino-6-methylbenzthiazole, 2-amino-6-methoxybenzthiazole, 2-amino-6-cyanobenzthiazole, 2-amino-6-nitrobenzthiazole, 2-amino-6-carboethoxybenzthiazole, 2-amino-6-thiocyanatobenzthiazole, 2-amino-6-methylsulphonylbenzthiazole, 2-amino-1,3,4-thiadiazole, 2-amino-1,3,5-thiadiazole, 2-amino-4-phenyl- or 4-methyl-1,3,5-thiadiazole, 2-amino-5-phenyl-1,3,4-thiadiazole, 2-amino-3-nitro-5-methylsulphonylthiophene, 2-amino-3,5-dinitrothiophene, 2-amino-3-alkoxycarbonyl-5-nitrothiophene (where alkoxy is preferably $C_{1-4}$-alkoxy), 2-amino-3-cyano-5-nitrothiophene, 5-amino-3-methyl-4-nitroisothiazole, 3-amino-5-nitro-2,1-benzisothiazole, 3-amino-7-bromo-5-nitro-2,1-benzisothiazole, 5-amino-4-nitro-1-methylimidazole, 4-amino-5-bromo-7-nitrobenzispthiazole and 4-amino-7-nitrobenztriazole.

Preferred heterocyclic amines are from the benzthiazole, triazole and thiophene classes, in particular 2-amino-6-methoxybenzthiazole, 2-amino-6-thiocyanatobenzthiazole, 3-amino-1,2,4-triazole and 2-amino-3,5-dinitrothiophene.

It is especially preferred that the amines do not contain substituents reactive towards concentrated sulphuric acid, other than by salt formation, or towards any other acid which is used to form the diazonium salt.

The first and second streams optionally contain further ingredients which are conventionally present in reaction media such as stabilisers, e.g. naphthalene-1,3,6-trisulphonic acid, and surfactants, e.g. lauryl trimethylammonium salts.

The heat evolved in the reaction can, in the case of strongly exothermic reactions, lead to an excessive temperature rise. If necessary, heat may be removed from the reactor by the provision of internal or external cooling means.

The residence time of the first and second compound in the reaction zone may be adjusted by altering the volume of the reaction zone or by varying the rate of flow of the first and second streams into and product stream out of the reaction zone.

A schematic representation of one embodiment of the present invention having one reaction zone is illustrated in FIG. 1.

Referring to FIG. 1, the process of the present invention will now be described at steady state. Amine, hydrochloric acid and sodium nitrite solution are fed into an external diazo reactor (A) to form a diazonium salt. The resultant diazonium salt stream is fed continuously into the loop reactor at inlet port (B) where it contacts with a mixture of the unreacted coupling component and recirculating product (i.e. the desired chemical compound). The mixture of diazonium salt, coupling component and desired product passes around the loop reactor (clockwise in FIG. 1) into the reaction zone (C) where the diazonium salt and coupling component react together to form the desired chemical compound. An adjustable valve at exit port (D) diverts part of the product stream into an exit pipe leading to buffer vessel (E), leaving part of the product stream to recirculate around the loop. Further coupling component is introduced into the loop at inlet port (F). If desired, base is added through inlet port (G) to maintain the pH in a desired range, e.g. in response to a signal from a pH probe present in the loop at point (H). Pump (I) pumps the mixed stream of coupling component and product around the continuous reactor where they meet freshly introduced diazonium salt at inlet port (B). The relatively high reactivity of the coupling component compared to the reactivity of the desired chemical compound means the diazonium salt preferentially reacts with the coupling component (rather than the desired chemical compound). In cases where the desired chemical compound does not have sufficient buffering capacity to maintain the desired pH throughout all manufacturing cycles one may introduce exogenous buffer into the loop periodically.

The reaction zone, or part of it, may optionally be contained within an agitated vessel into which the reactant streams are introduced (preferably close together at the point of greatest agitation) and from which the product stream is continuously removed. However it is preferred that the reaction zone is along a pipe defining a continuous loop in the reactor because this provides a particularly efficient environment for the reaction of the first and second compounds to form the desired chemical compound.

The recirculation reactor can, on occasions, induce the formation of stable froths in certain reaction systems. Where frothing is a problem it is desirable to include in the reactor a gas/liquid disengagement means, e.g. a cyclone. This enables gas to be removed from the liquids circulating around the reactor.

The reactor may therefore comprise a recirculation system having a mixing zone capable of containing froths and/or venting-off gases.

A Venturi™ injector or the like, in which the passage of a liquid produces a partial vacuum and turbulence, provides a suitable mixing zone. Inlet lines from storage tanks containing the reactants and leading into the throat of the Venturi™ injector at the point of maximum vacuum and turbulence provide the inlet lines for the reactant streams and ensure rapid mixing of the reactants. Alternatively T-Jet or static mixers may be used, for example the Kenics™ mixers sold by Chemineer and mixers sold by Sulzer.

According to a further aspect of the present invention there is provided a continuous reactor comprising one or more pipes defining a continuous loop and a means for recirculating liquid therein, the loop comprising:

a. an entry port for a first stream comprising a first compound;

b. an entry port for a second stream comprising a second compound capable of reacting with the first compound;

c. a reaction zone where the first and second compounds are capable of reacting to form a product stream containing a desired chemical compound; and d. an exit port for the product stream;

characterised in that the reactor further comprises a means for adjusting the amount of product stream which exits the loop relative to the amount of product stream recirculated to the reaction zone.

In one embodiment the means for adjusting the amount of product stream which exits the loop relative to the amount of product stream recirculated to the reaction zone is preferably a variable valve. However a simpler means is by volumetric displacement, i.e. the first and second streams and any other inlet streams displace liquid from the loop and the cross sectional areas and flow rates of the inlet streams and relative cross sections of the exit port and loop are used to determine the relative proportions of product stream exiting the loop relative to the amount of product stream recirculated to the reaction zone.

Preferably the loop further comprises an entry port for acid, base and/or pH buffer.

The entry port for the first and second stream may be separate ports along the loop or a single port, for example the first and second streams enter a single "Y"-shaped port where they combine before entering the loop.

Preferably the exit port comprises an exit pipe optionally having a buffer vessel in which the reaction between the first and second compounds may progress to substantial completion.

The means for recirculating liquid in the reactor is preferably a pump or like means for inducing motion of liquid.

The exit port may carry an outlet pipe in which the reaction may progress to substantial completion. Optionally a buffer vessel may be included at the end of or part way along this outlet pipe. The product stream may conveniently be removed by displacement as other liquids (e.g. first and second streams, acid, base, buffer etc.) are introduced into the reactor. Gravity and/or a pump may also be used to assist removal of the product stream, although often they are not necessary. Heat evolved during mixing and reaction may be removed by a suitable heat exchanger, e.g. a cooling jacket around the reactor and/or buffer vessel. There is also preferably provided a control means for adjusting the absolute or relative rates of delivery of the first and second streams into the reactor. A detection means for monitoring the quality of product may be incorporated in the reactor.

The reactor is preferably configured such that the pipes defining the continuous loop remain flooded with liquid throughout the continuous period for which the reactor is used. Such a configuration may be achieved by, for example, positioning the exit port higher than the entry port, preferably in the topmost quarter of the reactor, especially at the highest point of the reactor. In this way any unwanted gas in the loop rises and may be flushed out through the exit port. Another way of keeping the pipes flooded is to restrict the flow of liquid from the exit port, for example using a valve or by having an exit port of smaller internal cross-sectional area than the total cross sectional area of the inlet ports.

In the case of diazotisation processes, the detection means, which is preferably situated at or before the exit port, conveniently comprises a means for measuring the quantity of excess diazotising agent in the product stream and preferably provides a continuous indication of this quantity. A suitable detector for this purpose is described in Belgian Pat. No. 851,666. Alternatively the excess diazotising agent may be determined directly by means of the redox potential between platinum and glass electrodes placed in the product stream.

If it is desired to monitor the presence of unreacted starting material (e.g. an amine) in the product stream, this can be effected by diluting a portion of the product stream with water and measuring the turbidity of the diluted material in a spectrophotometer in the region where the starting material absorbs strongly (e.g. 700 nanometers in the case of some amines).

These measurements of excess diazotising agent and unreacted amine may be performed continuously or intermittently and the signals may be used to control the relative proportions and flow rates of the first and second streams by means of the control means.

The invention is illustrated by the following Examples in which the parts and percentages are by weight unless otherwise indicated.

EXAMPLE 1

Preparation of an Azo Compound

In this example the desired pH for the coupling reaction between a diazotized amine and a coupling component was a pH in the range 7 to 9.

(a) Preparation of Coupling Component Stream

Naphthalene-2-hydroxy-3,6-disulphonylamino-4-benzoic acid (0.91 mol) was dispersed in water (8.3 kg). Once charging was complete, the pH was adjusted to 7-8 using 47% sodium hydroxide solution. Agitation was continued until dissolution was complete. The volume was made up to 9.2 L by the addition of further water as required.

(b) Preparation of Amine and Nitrite Solution

3-Amino-1,2,4-triazole-5-carboxylic acid (1.27 mol) was dissolved in water (2.9 kg) at 45° C., pH 9. The pH was maintained at 9 to 10 by addition of 47% sodium hydroxide solution as required. The solution was cooled to room temperature and sodium nitrite (1.33 mol) was added. Stirring was continued until dissolution was complete. The volume was made up to 3.2 L by the addition of further water as required.

(c) Continuous Manufacture of Desired Product

The reaction apparatus consisted of a number of feed vessels and pumps, two reactors, a product hold tank (or "buffer vessel") and containers for the collection of product.

The first reactor was a small continuous stirred tank reactor for the production of the diazonium salt. This reactor was assembled such that the overflow (i.e. outlet) stream from this reactor would flow into the second reactor.

The second reactor consisted of a length of flexible tubing arranged in a "loop". Into this loop were fitted a centrifugal recirculation pump, a flow meter, a pH sensor, inlet ports for diazonium salt, coupling component stream and sodium hydroxide stream for pH adjustment and an exit port for the desired chemical compound. A flow meter and inlet port for diazonium salt were positioned downstream of the recirculation pump and the exit port was positioned still further downstream, such that the majority of the tubing length lay between the inlet port for the diazonium salt and the exit port. The exit port was located at the highest point of the loop reactor. The coupling component and sodium hydroxide inlet ports, and a pH sensor, were fitted between the exit port and the inlet ("suction side") of the recirculation pump.

Prior to start-up, the loop reactor was filled with water and the recirculation pump was started. The flow rate was adjusted to approximately 4 liters per minute (approximately 240 L/h) at the outlet of the recirculation pump. The exit port was initially directed to a waste receiver. The reagent feed pumps were set to the correct flow rates as given below and the diazonium salt precursors, coupling component and sodium hydroxide solution were charged to the appropriate feed vessels.

A small amount of sodium hydroxide was then fed into the loop to raise the pH to pH to approximately pH 10. The coupling component feed pump was started, such that coupling component stream entered the loop. The flow was allowed to continue until coupling component was present throughout the loop and the pH had stabilised at 8.5-9.5. The coupling component pump was then stopped.

The agitator in the first reactor (where the diazonium salt will be prepared) was switched on. The amine/sodium nitrite feed and hydrochloric acid feed pumps were started, giving flows of 7.7 liters per hour and 4.2 liters per hour respectively of the amine/nitrite solution and the hydrochloric acid solution into the first reactor to form a diazonium salt. The first reactor was allowed to fill.

Once the first reactor had filled, the coupling component feed pump was restarted (giving a flow of 22.1 liters per hour) and diazonium salt slurry formed in the first reactor was allowed to flow into the loop reactor. Via the inlet port. The pH of the coupling component in the loop reactor was maintained at approximately 9 by feeding in sodium hydroxide at an appropriate rate (a variable speed pump and pH controller were used to achieve this). A distinct colour change was observed to spread through the loop reactor from the diazonium salt inlet port, indicating the formation of the desired chemical compound (an azo dye). The desired chemical compound overflowed from the loop reactor via the exit port at a rate of approximately 37 liters per hour. The recycled flow therefore exceeded the throughput by a factor of approximately 6, therefore the Recirculation Ratio was about 6. This recycled stream of desired chemical compound provided pH buffering for subsequent cycles of the loop, such that the desired chemical compound was obtained consistently at approximately pH 8.

It was found that the loop reactor took a few residence times to achieve steady state, so the first 2.5 liters of product were discarded and the second 2.5 liters were collected and analysed separately from the bulk.

The desired chemical compound was obtained in good yield and purity.

COMPARATIVE EXAMPLE 1

Example 1 was repeated, except that the product stream was not recirculated into the incoming streams of diazonium salt and coupling component. As a consequence of this, the pH downstream of the diazonium salt inlet port fell significantly and the coupling component was seen to precipitate (along with some of the desired chemical compound, as it was formed). This was evidenced by a dramatic colour change. As a result of this precipitation, the desired chemical compound was obtained in low yield and was accompanied by large amounts of unreacted coupling component and diazonium salt (or decomposition products thereof). In addition, the pressure drop through the reactor was seen to increase significantly and gave rise to fouling or blockage of the loop reactor.

EXAMPLE 2

Preparation of a Chemical Intermediate

In this example, the desired pH for the coupling reaction between the diazotised amine and a coupling component was a pH in the range 6.6-6.8.

Preparation of Coupling Component Stream 1-amino-8-naphthol-3,6-disulphonic acid (1.04 mol) was dispersed in water (1.66 kg) at <5° C. When charging was complete the pH was adjusted to 6.5-7.0 using 47% sodium hydroxide to aid dissolution. In a separate vessel 2,4,6-trichloro-1,3,5-triazine (1.08 mol) was added to water (1.79 kg) at <5° C. and agitated. 4 g of calsolene oil was added to aid the dispersion. The 1-amino-8-naphthol-3,6-disulphonic acid solution was then added to the 2,4,6-trichloro-1,3,5-triazine solution and agitated till the reaction was complete.

Preparation of Amine and Nitrite Solution 5-aminoisophthalic acid (1.00 mol) was added to water (2.43 kg). The pH was adjusted to 8 using 47% sodium hydroxide to aid dissolution. Sodium nitrite (1.02 mol) was then added to the solution.

Preparation of pH 7 Phosphate Buffer

Sodium dihydrogen orthophosphate dihydrate (1.00 mol) was dissolved in water and made up to a volume of 1 L. The pH of the solution was adjusted to 7 with 47% sodium hydroxide.

Continuous Manufacture of Desired Product

A diazonium salt stream was formed in a small continuous stirred tank reactor assembled such that the overflow (i.e. outlet) stream from this reactor would flow into the continuous reactor.

The continuous reactor comprised a length of flexible tubing arranged in a "loop". Into this loop were fitted a centrifugal recirculation pump, a flowmeter, a pH sensor, inlet ports for the diazonium salt, coupling component stream, buffer stream and a sodium hydroxide stream for pH adjustment and an exit port for the product. A flowmeter and inlet port for diazonium salt were positioned downstream of the recirculation pump and the exit port was positioned still further downstream, such that the majority of the tubing length lay between the inlet port for the diazonium salt and the exit port. The exit port was located at the highest point of the loop reactor. The coupling component, sodium hydroxide and buffer inlet ports, and a pH sensor, were fitted between the exit port and the inlet ("suction side") of the recirculation pump.

Prior to start-up, the loop was filled with water and the recirculation pump was started. The flowrate was adjusted to approximately 4 liters per minute (approximately 240 L/h) at the outlet of the recirculation pump. The exit port was initially directed to a waste receiver. The reagent feed pumps were set to the correct flow rates as given below and the diazonium salt precursors, coupling component, sodium hydroxide and buffer solution were charged to the appropriate feed vessels.

The agitator in the vessel where the diazonium salt will be prepared was switched on. The amine/sodium nitrite feed and hydrochloric acid feed pumps were started, giving flows of 10.4 liters per hour and 4.6 liters per hour respectively into the amine/nitrite solution and the hydrochloric acid solution into the vessel to form a diazonium salt. The vessel was allowed to fill.

Once the vessel had filled, the coupling component feed pump into the reactor was started (giving a flow of 15.2 liters per hour) and diazonium salt slurry formed in the vessel was allowed to flow into the loop via an inlet port. The pH of the product in the loop was maintained in the range 6.6-6.8 by feeding in 0.24 mole equivalents of pH 7 phosphate buffer and 10% sodium hydroxide at an appropriate rate (variable speed pumps). A distinct colour change was observed to spread through the loop from the diazonium salt inlet port, indicating the formation of the desired product. The product overflowed from the loop and was allowed through the exit port at a controlled rate (controlled using a valve) of approximately 29 liters per hour. The recycled flow rate therefore exceeded the removal rate by a factor of approximately 8. Therefore the Recirculation Ratio was about 8.

It was found that the loop reactor took a few residence times to achieve steady state, so the first 1.5 L of product were discarded and the following 4.8 L were collected and analysed separately from the bulk.

The desired product was obtained in good yield and purity.

COMPARATIVE EXAMPLE 2

The coupling reaction was repeated using conventional, non-continuous laboratory equipment. A phosphate buffer was used to maintain the pH of the coupling reaction between 6.6 and 6.8. As a consequence of this, 16.5 mole equivalents of buffer was required (compared to 0.24 moles required in Example 2). The desired chemical compound was obtained in good yield and purity.

COMPARATIVE EXAMPLE 3

The coupling reaction was repeated using conventional, non-continuous laboratory equipment. An equivalent amount of buffer to that consumed in the continuous manufacture, 0.24 mole equivalents, was used. As a consequence of this the desired pH remained low throughout the reaction and the desired chemical compound was obtained in poor yield and low quality.

EXAMPLE 3

Preparation of a Trisazo Compound

In this example, the desired pH for the coupling reaction between the diazotised amine and a coupling component was a pH in the range 6.5-7.5.

Preparation of Coupling Component Stream 3-carboxy-1-(4-sulphophenyl)pyrazol-5-one (1.05 mol) was dispersed in water (0.80 kg). Once charging was complete 69 g of 47% NaOH (aq) was added (0.81 mol).

Preparation of Amine and Nitrite Solution

A disazo compound having an amino group (prepared as described in International Patent Application number PCT/GB03/001575, Example 2, Stage (B), 1.00 mol) was added to water (5.27 kg). The pH was adjusted to 8 using 47% sodium hydroxide. Sodium nitrite (1.15 mol) was then added to the solution.

Preparation of pH 7 Phosphate Buffer

Sodium dihydrogen orthophosphate dihydrate (1.00 mol) was dissolved in water and made up to a volume of 1 L. The pH of the solution was adjusted to 7 using 47% sodium hydroxide.

Continuous Manufacture of Desired Product

A first and second reactor were configured essentially as described in Example 1. The pH of the loop reactor was maintained in the range 6.5-7.5 by feeding in 0.85 mole equivalents of pH 7 phosphate buffer and 10% sodium hydroxide at an appropriate rate using variable speed pumps. The desired trisazo compound overflowed from the loop reactor via the exit port at a rate of approximately 38 liters per hour. The recycled flow therefore exceeded the throughput by a factor of approximately 6, therefore the Recirculation Ratio was about 6.

It was found that the loop reactor took a few residence times to achieve steady state, so the first 1.9 liters of product were discarded and the following 5.7 liters were collected and analysed separately from the bulk.

Once a steady-state was established (after 7-8 minutes in this case), the desired trisazo compound was obtained in good yield and purity.

COMPARATIVE EXAMPLE 4

The coupling reaction of Example 3 was repeated but instead of using the continuous reactor conventional, non-continuous laboratory equipment was used. A phosphate buffer was used to maintain the pH of the coupling reaction between 6.5 and 7.5. As a consequence of this, 1.65 mole equivalents of buffer was required (compared to 0.85 moles in Example 3). The desired chemical compound was obtained in good yield and purity.

COMPARATIVE EXAMPLE 5

The process of Example 3 was repeated using a semi batch process in the absence of phosphate buffer. The pH was maintained between 6.0 and 7.0 by addition of a sodium bicarbonate (2 mole equivalents) buffer and adjusted with 47% sodium hydroxide. The desired chemical compound was formed in lower yield and purity than was observed in Example 3.

The invention claimed is:

1. A process for the preparation of a desired chemical compound in a continuous reactor which comprises the following stages:
   (i) mixing together in a reaction zone of the reactor at a pH within a desired pH range a first stream comprising a first compound and a second stream comprising a second compound capable of reacting with the first compound such that a product stream containing the desired chemical compound is formed;
   (ii) removing part of the product stream from the reactor, leaving part of the product stream in the reactor; and
   (iii) recirculating the product stream remaining in the reactor from stage (ii) into the reaction zone thereby assisting maintenance of the desired pH range during a subsequent performance of stage (i).

2. A process according to claim 1 wherein the Recirculation Ratio is from 10 to 1.

3. A process according to claim 1 wherein the Recirculation Ratio is from 50 to 0.3.

4. A process according to claim 1 wherein the desired chemical compound has acid and/or basic groups and acts as a buffer for maintaining the desired pH range.

5. A process according to claim 1 wherein the first compound is a diazonium salt.

6. A process according to claim 1 wherein the desired chemical compound is a colorant.

7. A process according to claim 1 wherein the reactor has one reaction zone.

8. A process according to claim 1 wherein the stages are performed continuously until the required quantity of desired chemical compound has been made.

9. A process according to claim 1 wherein at steady state stages (i), (ii) and (ii) are performed simultaneously, albeit at different points of the reactor.

10. A process according to claim 1 wherein maintenance of the desired pH range is assisted by the addition of acid and/or base to the reactor.

11. A process according to claim 1 wherein:
a. the first compound is a diazonium salt;
b. the desired chemical compound is a colorant;
c. the reactor has one reaction zone;
d. the stages are performed continuously until the required quantity of desired chemical compound has been made; and
e. at steady state stages (i), (ii) and (ii) are performed simultaneously, albeit at different points of the reactor.

12. A process according to claim 11 wherein the desired chemical compound has acid and/or basic groups and acts as a buffer for maintaining the desired pH range.

13. A process according to claim 11 wherein maintenance of the desired pH range is assisted by the addition of acid and/or base to the reactor.

* * * * *